Aug. 30, 1932.  L. H. DUGAN  1,874,259
GENERATOR TESTER
Filed Feb. 12, 1930  2 Sheets-Sheet 1

Louis H. Dugan, INVENTOR
BY Victor J. Evans
ATTORNEY

Aug. 30, 1932.　　　L. H. DUGAN　　　1,874,259
GENERATOR TESTER
Filed Feb. 12, 1930　　　2 Sheets-Sheet 2
Fig. 3.
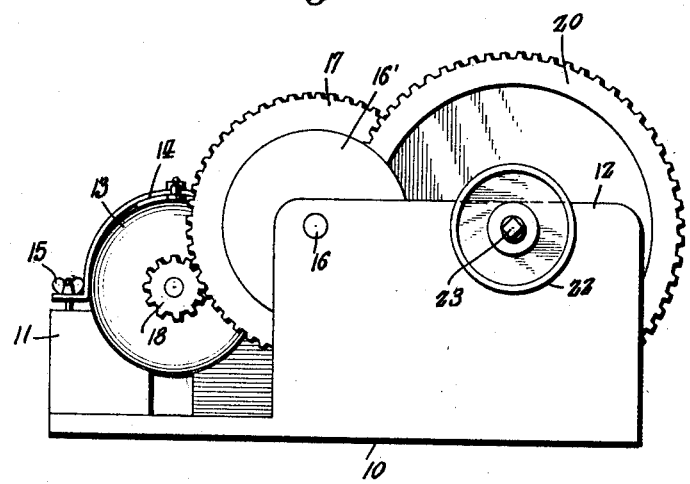
Fig. 4.
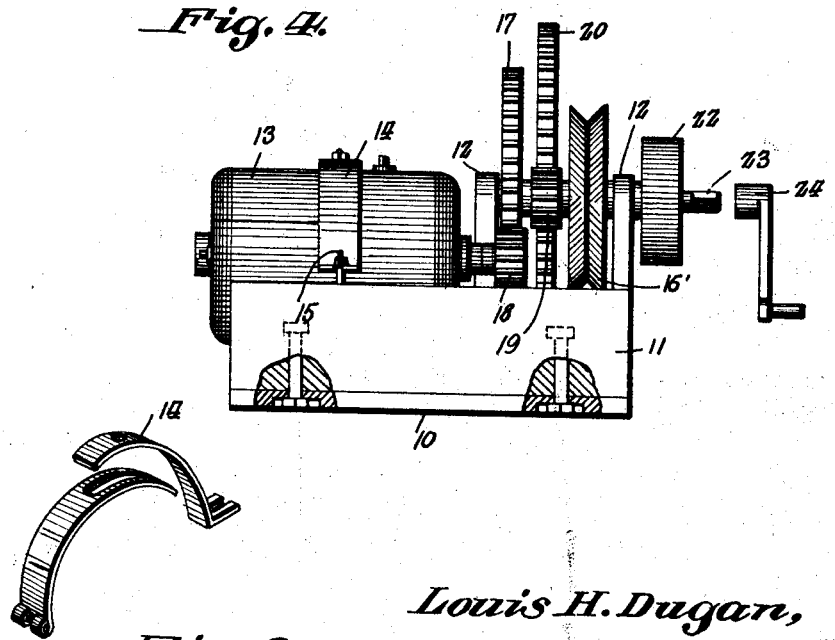
Fig. 6.
Louis H. Dugan,
INVENTOR
BY Victor J. Evans
ATTORNEY Patented Aug. 30, 1932

1,874,259

UNITED STATES PATENT OFFICE

LOUIS H. DUGAN, OF TIPTON, OKLAHOMA

GENERATOR TESTER

Application filed February 12, 1930. Serial No. 427,971.

The present invention relates to a generator testing device, by means of which the generator can be quickly and conveniently supported upon a suitable supporting structure, and the armature shaft rapidly rotated with a view of determining whether or not the generator is defective.

Another important object of the invention resides in the supporting structure for the generator, which is susceptible of adjustment to accommodate itself to different type generators or generators of different sizes.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts of the several parts and wherein:

Figure 3 is a view similar to Figure 1 looking from the opposite side of the device.

Figure 4 is a side elevation.

Figure 6 is a detail view of the clamping band.

Figure 1:
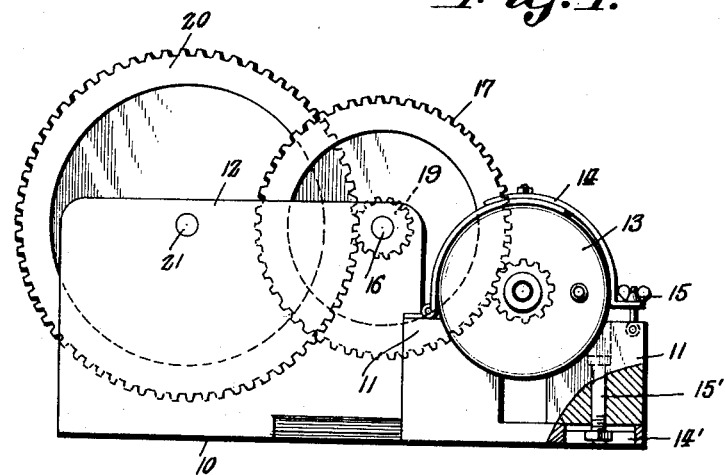
Figure 1 is an end elevation of the invention, partly in section and showing the generator associated therewith.
Figure 2:
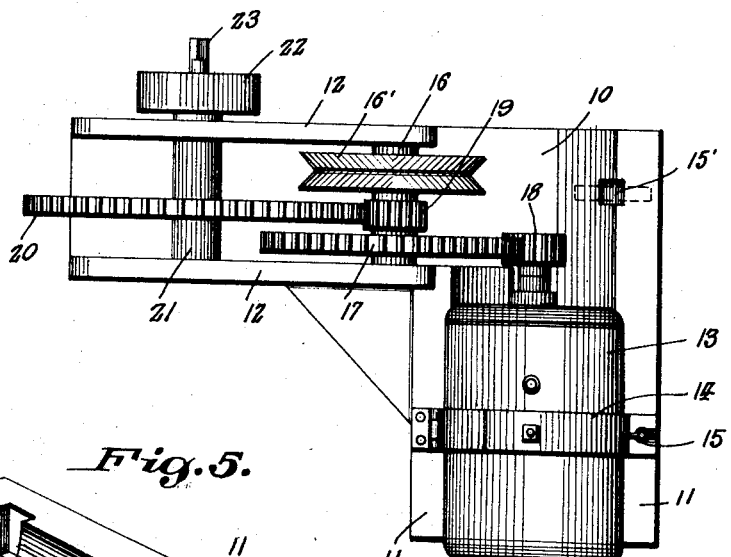
Figure 2 is a top plan view.
Figure 5:
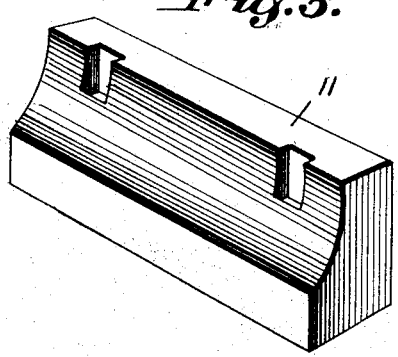
Figure 5 is a detail view of one side wall of the generator support.

The device forming the subject matter of this invention comprises a supporting structure or base which is substantially L-shaped as clearly illustrated in Figure 2, and includes a base 10, spaced parallel walls 11 rising from one branch of the base, and similar walls 12 rising from the other branch of the base and at right angles to the walls 11. The generator to be tested is indicated at 13, and is placed between the walls 11 which conveniently support the generator, the latter being held in place by means of a hinged clamp 14 which can be held in effective engagement with the generator by any suitable fastening means indicated generally at 15. It will be noted upon inspection of the drawings that one wall 11 is slidably mounted on the base 10 for movement toward and away from the other wall 11, so that the support can be adjusted to accommodate itself to generators of different sizes. The base is slotted as at 14' to receive the bolts 15', carried by the movable wall and provided with suitable nuts for holding the walls 11 fixed relatively in given adjusted positions. Furthermore, the clamp 14 is also made up of two sections one of which is slotted to receive the fastening elements carried by the other section, so that the clamp can be adjusted to accommodate itself to generators of different sizes. Supported between the spaced vertical walls 12 is the mechanism or means for rapidly rotating the armature shaft of the generator, with a view of determining whether or not the latter is defective, and this mechanism can be either operated by power or manually.

For this purpose, I employ a shaft 16 which is journaled between the walls 12, and which shaft supports a large gear 17 which meshes with a small gear or pinion 18 carried by the armature shaft of the generator. Also carried by the shaft 16 is a relatively small gear 19 which meshes with a large gear 20 carried by a shaft 21 also journaled between the walls 12 of the supporting structure, in spaced parallel relation with the shaft 16. This shaft 21 may of course be power operated, for which purpose the shaft is provided with a belt pulley 22, but the shaft is preferably rotated manually, having a squared extremity 23 to accommodate a crank handle 24. It is of course understood that some generators are provided with fan belt pulleys instead of the pinion or gear 18, and in order that a generator of this type may also be operated from the shaft 16, the latter is provided with a belt pulley 16' and manifestly when a generator provided with a fan belt pulley on the armature shaft is mounted upon the walls 11, a suitable belt is trained over said pulley and also the belt pulley 16'.

After the generator has been placed upon the supporting structure, and geared with the gear 17 of the operating mechanism or operated from the belt pulley 16' in the manner above described, the armature shaft can be very rapidly rotated the same as when the generator is connected on a car with a view of determining whether or not the generator is defective. The small wire connected with the generator will show the condition of the latter incident to the rotation of the armature shaft, by striking the end of the wire on the generator housing or generator ground. If the generator is in working condition a flash will appear, but if the generator is defective no flash will occur during the test. Furthermore an ampere indicator may be used without departing from the inventive idea.

While it is believed that from the foregoing description the nature and advantages of the invention will be readily understood, I desire to have it known that I do not limit myself to what is herein illustrated and described, and that such changes may be resorted to when desired as fall within the scope of what is claimed.

What I claim is:

In a generator testing device of the character described, a base including right angularly disposed branches, spaced parallel walls rising from one branch and between which the generator is adapted to be supported, said branch having spaced parallel slots therein, one of said walls being slidably mounted on said branch for adjustment toward and away from the other wall to accommodate generators of different sizes, bolts carried by the movable wall and received by said slots, nuts associated with said bolts for holding the movable wall fixed with relation to the base in a given position, adjustable clamping means adapted to connect said walls to hold the generator in position thereon, spaced parallel walls rising from the other branch of the base, a shaft journaled between the last mentioned walls, means for rotating the shaft, and means for rotating the armature shaft of the generator from the first mentioned shaft.

In testimony whereof I affix my signature.

LOUIS H. DUGAN.